United States Patent [19]

Henderson et al.

[11] 3,758,680

[45] Sept. 11, 1973

[54] COMPOSITION OF MATTER AND METHOD OF USE

[75] Inventors: Norman Leo Henderson, Park Ridge, N.J.; August Joseph Bruno, Chester, N.Y.; James Joseph Drain, Trenton, N.J.

[73] Assignee: American Cyanamid Company, Stamford, Conn.

[22] Filed: Mar. 22, 1971

[21] Appl. No.: 127,024

[52] U.S. Cl.................. 424/22, 424/19, 424/228, 424/229
[51] Int. Cl................................................ A61k 9/00
[58] Field of Search................ 424/19–22, 228, 229

[56] References Cited
UNITED STATES PATENTS

| | | | |
|---|---|---|---|
| 3,535,419 | 10/1970 | Siegrist et al. | 424/22 |
| 3,507,952 | 4/1970 | Rednick et al. | 424/22 |
| 3,056,724 | 10/1962 | Marston | 424/14 |
| 3,594,469 | 7/1971 | Whitehead et al. | 424/14 |

FOREIGN PATENTS OR APPLICATIONS

| | | |
|---|---|---|
| 936,386 | 9/1963 | Great Britain |
| 972,128 | 10/1964 | Great Britain |

*Primary Examiner*—Shep K. Rose
*Attorney*—Ernest Y. Miller

[57] ABSTRACT

A composition of matter consisting of sulfamethoxypyridazine or sulfaethoxypyridazine, a bismuth subcarbonate or bismuth subnitrate and ethylcellulose in a sustained release formulation which provides prolonged high sulfonamide blood levels in the treatment of warm-blooded and particularly ruminant animals. A method of using said compositions for controlling bacterial infections is described.

5 Claims, No Drawings

COMPOSITION OF MATTER AND METHOD OF USE

PRIOR ART

The use of sulfamethazine in cattle has been described by Ellison et al. Journal of the American Veterinary Medical Association 150 No. 6 pp. 629–633, March, 1967.

DESCRIPTION OF THE INVENTION

The present invention relates to compositions containing sulfapyridazines, bismuth subcarbonate or bismuth subnitrate and ethylcellulose and method of using the same.

The sulfapyridazines useful in the present invention are those of the formula:

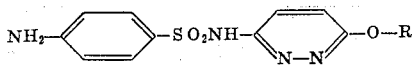

wherein R is methyl or ethyl.

The preparation of the above compounds is described in U. S. Pat. No. 2,712,012.

It is known that sulfa drugs such as sulfapyridazines are useful in combatting bacterial diseases in warm-blooded and particularly ruminant animals. To be effective both magnitude and duration of the sulfonamide blood level concentration is of prime importance to successful antibacterial therapy.

It has been found that a formulation comprising from 0 to 40 percent of a rapid release granulation and from 100 to 60 percent of a sustained release granulation wherein the active ingredients are sulfaethoxypyridazine or sulfamethoxypyridazine and high density bismuth subcarbonate or bismuth subnitrate combined with from 2 to 5 percent ethylcellulose, when compressed into dosage unit forms such as OBLETS, tablets etc. provide initially high and prolonged blood levels eminently useful for successful sulfonamide therapy in warm-blooded animals particularly in ruminant animals.

Compositions of the present invention, which in the form of an OBLET provide effective therapy may be specifically prepared as follows: A rapid release granulation, comprising about 90 percent sulfaethoxypyridazine or sulfamethoxypyridazine with excipients such as starch, is prepared with the aid of water as a granulating medium. A sustained release granulation is prepared containing about 60 percent of sulfaethoxypyridazine or sulfamethoxypyridazine, about 37 percent high density (approximately 6.7 g./cc.) bismuth subcarbonate or bismuth subnitrate and about 3 percent ethylcellulose. The latter is granulated with about 75 percent isopropanol, ethanol or chlorinated hydrocarbons. The two granulations are blended to give best results in the proportion of about 25 percent of rapid release with 75 percent of sustained release resulting in having the sulfadrug present in from 62 to 68 percent. Small amounts of lubricant such as magnesium stearate and stearic acid are added to the blend and the material is then screened and compressed into OBLETS. A typical OBLET prepared by such process would be one weighing 23.5 grams with dimensions of 2 inches by thirteen/sixteenths inches and containing 15.0 grams of sulfaethoxypyridazine or sulfamethoxypyridazine, 7.15 grams of high density bismuth subcarbonate or bismuth subnitrate and less than a gram of ethylcellulose.

The purpose of the high density bismuth subcarbonate or bismuth subnitrate is to provide a dosage unit particularly in cattle which will remain in the rumen during the period of release and which will not be excreted by the animal before the sulfaethoxy- or sulfamethoxypyridazine has been absorbed into the animals blood stream.

The present invention shows improved results when dosage units contain from about 60 to 72 percent sulfaethoxy- or sulfa-methoxypyridazines, 23 to 35 percent heavy density bismuth subcarbonate or bismuth subnitrate and about 2 to 5 percent ethylcellulose. These figures are derived from using compositions consisting of 0 to 40 percent of fast release sulfaethoxy- or sulfamethoxypyridazines combined with from 100 to 60 percent of sustained release formulation comprising sulfaethoxy- or sulfamethoxypyridazine, heavy density bismuth carbonate or bismuth subnitrate and from 2 to 5 percent ethylcellulose.

SPECIFIC DISCLOSURE

The following examples show the preparation of an effective dosage form (OBLET) and the comparative effect of blood levels between the OBLET prepared in accordance with the present invention, OBLETS without sustained release formulation and a leading commercial product (sustained release sulfamethazine).

EXAMPLE 1

PREPARATION OF SUSTAINED RELEASE OBLETS

The following formulation is prepared:

Part A (Rapid Release):
| | |
|---|---|
| Sulfaethoxypyridazine (S.E.Z.) | 75.0 grams |
| Starch, USP Screened | 7.0 grams |
| Starch, Modified | 1.8 grams |
| Purified water | qs. |

Part B (Sustained Release):
| | |
|---|---|
| Sulfaethoxypyridazine (S.E.Z.) | 225.0 grams |
| Bismuth Subcarbonate, High Density | 143.0 grams |
| Ethylcellulose NF (10 cps) | 11.0 grams |
| Isopropanol 75% | 96.0 grams |

Parts A and B are granulated separately and then blended together for 10 minutes. A 1.8 gram portion of magnesium stearate USP and a 1.8 gram portion of stearic acid USP are added and the mixture is blended for 3 minutes. The mixture is then compressed into OBLETS. This formulation is sufficient to provide 20 OBLETS 2 inches × 13/16 inches × 0.75 inches, containing 15.0 grams of sulfaethoxy-pyridazine and 7.15 grams of bismuth subcarbonate and weighing an average 23.5 grams.

EXAMPLE 2

COMPARATIVE BLOOD LEVEL STUDIES

Comparative blood level studies are carried out employing the following dosage units:

A. Sulfamethazine sustained release OBLETS, Norden Labs. (Each contains 22.5 gm. of sulfamethazine) (120 mg./lb.)

B. OBLETS containing 75 percent sustained release and 25 percent fast release granulations (prepared as described in Example 1) (100 mg./lb.)

C. OBLETS containing only sustained release sulfae-thoxy-pyridazine-bismuth subcarbonate granulation (100 mg./lb.)
D. OBLETS containing only fast release sulfaethoxypyridazine granulation (25 mg./lb.)

OBLETS are administered orally to cattle at the indicated doses. The sulfonamide blood level of the individual animals are determined at 3, 6, 12, 24, 36, 48, 60, 72, 96, 120 and 144 hours. The relative results appearing in Graph I are as follows:

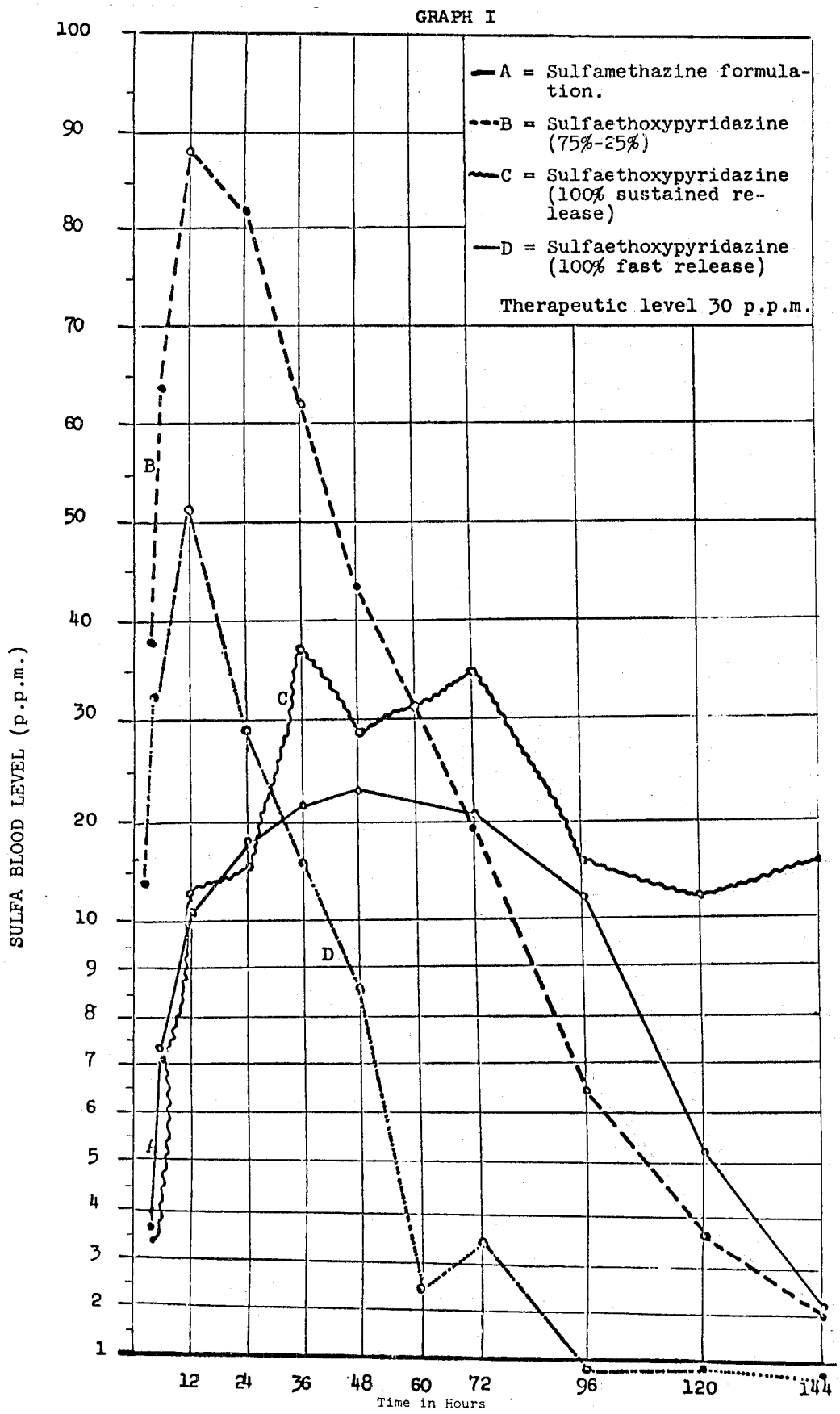

GRAPH I

A = Sulfamethazine formulation.
B = Sulfaethoxypyridazine (75%-25%)
C = Sulfaethoxypyridazine (100% sustained release)
D = Sulfaethoxypyridazine (100% fast release)

Therapeutic level 30 p.p.m.

This graph (I) shows the curve A (sulfamethazine formulation) blood levels reached about 20 ppm after about 36 hours and then decreased at a steady rate up to 144 hours. Curve B (compositions of the present invention 75 percent sustained release and 25 percent fast release) shows that sulfonamide blood levels reached a peak of 89 ppm in only 12 hours and then a steady decline up to 144 hours. A composition of this type therefore provides much higher blood levels in a much shorter period of time than curve A. Curve C (100 percent sustained release) showed a slow buildup in sulfonamide blood levels (35 ppm at 36 hours), and as expected, a slow release rate up to 144 hours. Curve D (100 fast release) showed a fast buildup in sulfonamide blood levels (50 ppm at 12 hours) but as expected, the sulfonamide blood levels fell rapidly. The following Table I shows the testing results obtained.

TABLE I

| Time post-administration, hours | Apparent sulfaethoxypyridazine in blood, ppm | | | |
|---|---|---|---|---|
| | A | B | C | D |
| 3 | 3.6 | 38.1 | 3.4 | 14.2 |
| 6 | 7.3 | 60.4 | 7.2 | 32.3 |
| 12 | 10.2 | 89.2 | 13.0 | 51.3 |
| 24 | 18.7 | 81.9 | 15.2 | 29.9 |
| 36 | 21.8 | 62.1 | 35.7 | 16.7 |
| 48 | 22.2 | 44.9 | 29.3 | 8.6 |
| 60 | - | - | 30.7 | 2.5 |
| 72 | 20.1 | 19.0 | 34.6 | 3.5 |
| 96 | 12.6 | 6.5 | 16.4 | 0.8 |
| 120 | 5.2 | 3.7 | 12.5 | 0.6 |
| 144 | 2.1 | 2.0 | 10.6 | 0.7 |

EXAMPLE 3

Following the procedure and formulations of Example 1, Parts A and B were granulated separately but not blended together. Instead they were compressed on a standard layering tabletting machine providing layered tablets which compressed about 25 percent rapid release and about 75 percent sustained release material. Results obtained are similar to that of Example 2(B).

EXAMPLE 4

In the following tests three calves, each weighing between 300 and 400 pounds, are given 25 mg./lb. of body weight of sulfaethoxypyridazine. The drug is administered as a single oral dose using the commercial 17.1 gram tablets marketed as S.E.Z. (sulfaethoxypyridazine) OBLETS. These OBLETS have the following analysis:

Sulfaethoxypyridazine Rapid Release Formulation

| Sulfaethoxypyridazine | 15.0 gm. |
|---|---|
| Cornstarch (modified) | .5 gm. |
| Cornstarch USP | 1.5 gm. |
| Magnesium Stearate USP | .09 gm. |
| FD and C Red Dye No. 2 | .03 gm. |

At intervals up to 120 hours following treatment, blood samples are taken from each of the animals and sulfonamide determinations made thereon. Results of these tests are shown in Table 2 as follows:

TABLE 2

| Time Post Administration, hrs. | Apparent sulfaethoxypyridazine in blood, PPM |
|---|---|
| 3 | 14.2 |
| 6 | 32.3 |
| 12 | 51.3 |
| 24 | 29.9 |
| 36 | 16.7 |
| 48 | 8.6 |
| 60 | 2.5 |
| 72 | 3.5 |
| 96 | 0.8 |
| 120 | 0.6 |

From these data it can be seen that utilizing the above procedure sulfonamide blood levels reach therapeutically effective levels in about six hours, peak at about twelve hours and then begin to diminish. These data are also presented in Graph II as follows:

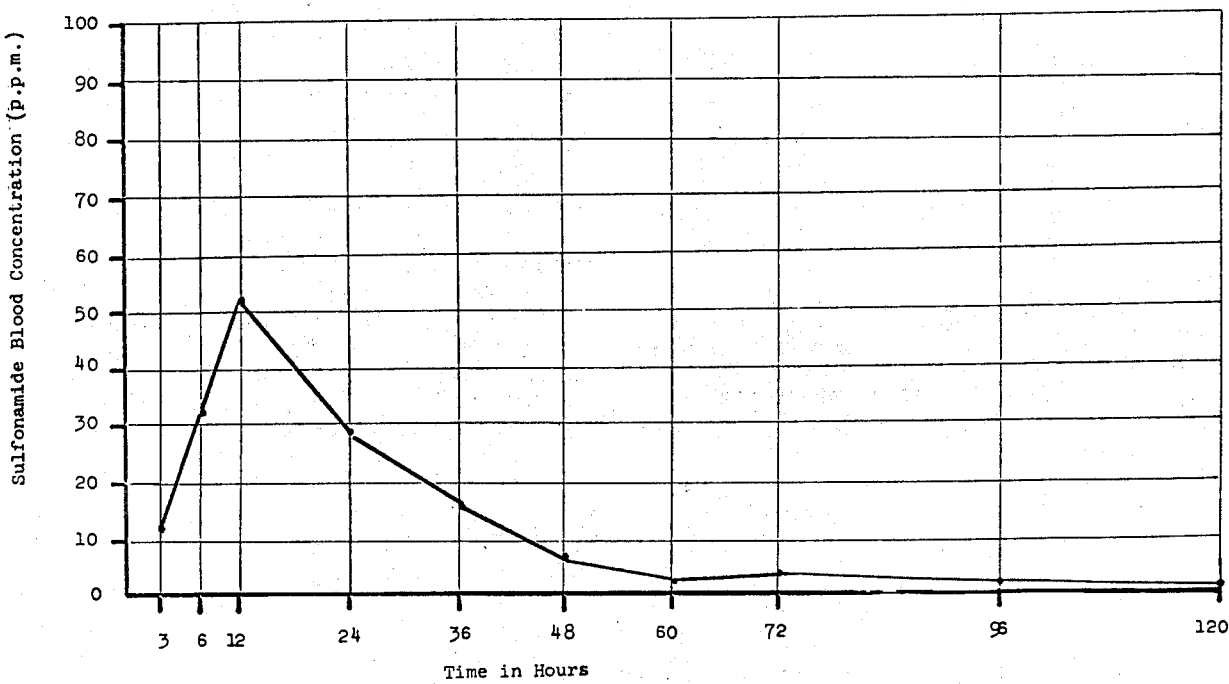

Graph II

Average and Range of Sulfonamide Blood Concentrations in Cattle Given S.E.Z.® (Regular) at 25 mg./lb.

(30 p.p.m. therapeutic level)

In practice, in order to maintain sulfaethoxypyridazine blood levels above about 30 PPM (therapeutic level) for an extended period, for example, from 3 to 5 days, the drug is administered on a daily basis for the desired period at the above levels (i.e., 25 mg./lb. body weight)

A standard calf diet is used throughout the tests and feed and drink is ad libitum.

EXAMPLE 5

For the following tests, sulfaethoxypyridazine is used in three different formulations designed to provide sustained release of sulfaethoxypyridazine over an extended period of about five days. The formulations set forth below are prepared and then compacted as OBLETS of the same size and shape of those used in Example 4. Nine calves weighing between 300 and 400 lbs. each are selected and randomly placed in one of three treatment groups.

The test OBLETS are given as a single oral dose at 75 mg./lb. of body weight. Blood samples from each calf are taken at intervals up to 120 hours after treatments and all samples are analyzed for sulfaethoxypyridazine. The blood levels for each treatment are given below.

Sustained Release Formulations - (No Rapid Release)

|  | A | B | C |
|---|---|---|---|
| Sulfaethoxypyridazine | 15.00 | 15.00 | 15.00 |
| Bismuth subcarbonate | 7.05 | 6.60 | 6.20 |
| Ethylcellulose N.F. 10 cps. | 0.65 | 1.10 | 1.50 |
| Stearic Acid | 0.15 | 0.15 | 0.15 |
| Magnesium Stearate | 0.15 | 0.15 | 0.15 |
| Total | 23.00 | 23.00 | 23.00 |

% Ethylcellulose (A, 3), (B, 5) and (C, 7).

TABLE 3
Blood Levels

| Time Post Administration, hrs. | Apparent Sulfaethoxypyridazine in Blood, PPM | | |
|---|---|---|---|
|  | A | B | C |
| 3 | 2.4 | 1.7 | 1.05 |
| 6 | 5.9 | 3.8 | 2.6 |
| 12 | 9.3 | 3.2 | 6.4 |
| 24 | 9.5 | 7.7 | 10.8 |
| 36 | 29.8 | 6.2 | 5.2 |
| 48 | 24.0 | 15.4 | 12.4 |
| 60 | 14.3 | 11.4 | 7.8 |
| 72 | 45.8 | 41.8 | 16.6 |
| 96 | 21.3 | 26.7 | 6.3 |
| 120 | 13.3 | 15.8 | 5.3 |

From these data it can be seen that the 3 and 5 percent ethylcellulose formulations give a sustained release of sulfonamide starting at 36 or 48 hours respectively. The 7 percent ethylcellulose formulation did give sustained release but did not achieve satisfactory sulfonamide blood concentration.

EXAMPLE 6

Marked improvement in the early release of sulfaethoxypyridazine from a sustained release tablet is obtained with the following formulations containing from about 20 to 40 by weight of the rapid release composition of Example 4 and from about 80 to 60 percent by weight of the sustained release composition of formulation A in Example 5.

The ethylcellulose component is related only to the sustained-release granulation; i.e., in preparation of the final tablet a sustained-release component such as described in Example 1 is physically admixed with a rapid release granulation such as described in Example 5.

In these tests, the OBLETS are prepared and administered to calves as described in Example 4. Blood samples are taken at 3, 6, 12 and 24 hours after treatment and analyzed for sulfaethoxypyridazine. Administration was at 100 mg./lb. of body weight for all treatments and data obtained are reported below in Table 4.

TABLE 4

|  | A | B | C | D |
|---|---|---|---|---|
| Rapid release (%) | 20 | 25 | 25 | 40 |
| Sustained release (%) | 80 | 75 | 75 | 60 |
| Ethylcellulose release fraction (%) | 2 | 2 | 3 | 3 |
| Time Post Administration (hours) | A | B | C | D |
| 3 | 9.4 | 8.9 | 20.0 | 21.1 |
| 6 | 16.5 | 33.1 | 69.6 | 42.6 |
| 12 | 67.8 | 62.0 | 81.5 | 47.0 |
| 24 | 58.5 | 83.2 | 99.6 | 86.2 |

EXAMPLE 7

Inventive Composition

Enhanced early release and improved sustained release of sulfaethoxypyridazine into the blood stream of cattle is evidenced by the following tests wherein test formulations are made up and compacted into OBLETS of the same size and shape as described in Example 4 (i.e., 2 inches × 13/16 inches). Formulations prepared are as follows:

|  | A | B | C |
|---|---|---|---|
| Sulfaethoxypyridazine | 15.00tg | 15.00 | 15.00 |
| Starch USP | 0.35 | 0.28 | 0.21 |
| Starch Modified | 0.15 | 0.12 | 0.09 |
| Bismuth Subcarbonate | 7.98 | 8.05 | 8.10 |
| Magnesium Stearate | 0.15 | 0.15 | 0.15 |
| Stearic acid | 0.15 | 0.15 | 0.15 |
| Ethylcellulose N.F. (10 cps) | 0.55 | 0.59 | 0.62 |

Formulation (A) is a 75 percent sustained release, 25 percent rapid release formulation, (B) is an 80/20 formulation and (C) is an 85/15 formulation. All formulations are prepared to contain 3 percent ethylcellulose in the sustained-release fraction.

The OBLET are administered to calves weighing 300 to 400 lbs. each as a single oral dose 100 mg./lb. of body weight. Six calves per treatment are used and blood samples are taken periodically from each calf following treatment. Data obtained are reported below in Table 5.

TABLE 5

| Time Post Administration, hrs. | Apparent Sulfaethoxypyridazine in Blood, PPM | | |
|---|---|---|---|
|  | A | B | C |
| 3 | 17.0 | 10.0 | 3.4 |
| 6 | 71.3 | 39.4 | 14.2 |
| 12 | 94.0 | 66.1 | 49.1 |
| 24 | 81.1 | 102.1 | 69.3 |
| 36 | 105.1 | 109.6 | 56.8 |
| 48 | 51.3 | 67.3 | 62.6 |
| 72 | 26.7 | 31.9 | 37.9 |
| 96 | 14.0 | 15.8 | 32.3 |
| 120 | 5.9 | 5.6 | 13.6 |

The above data are compared on Graph III with the data of Example 4 obtained with the standard commercial sulfaethoxypyridazine product given as a single oral dose.

GRAPH III

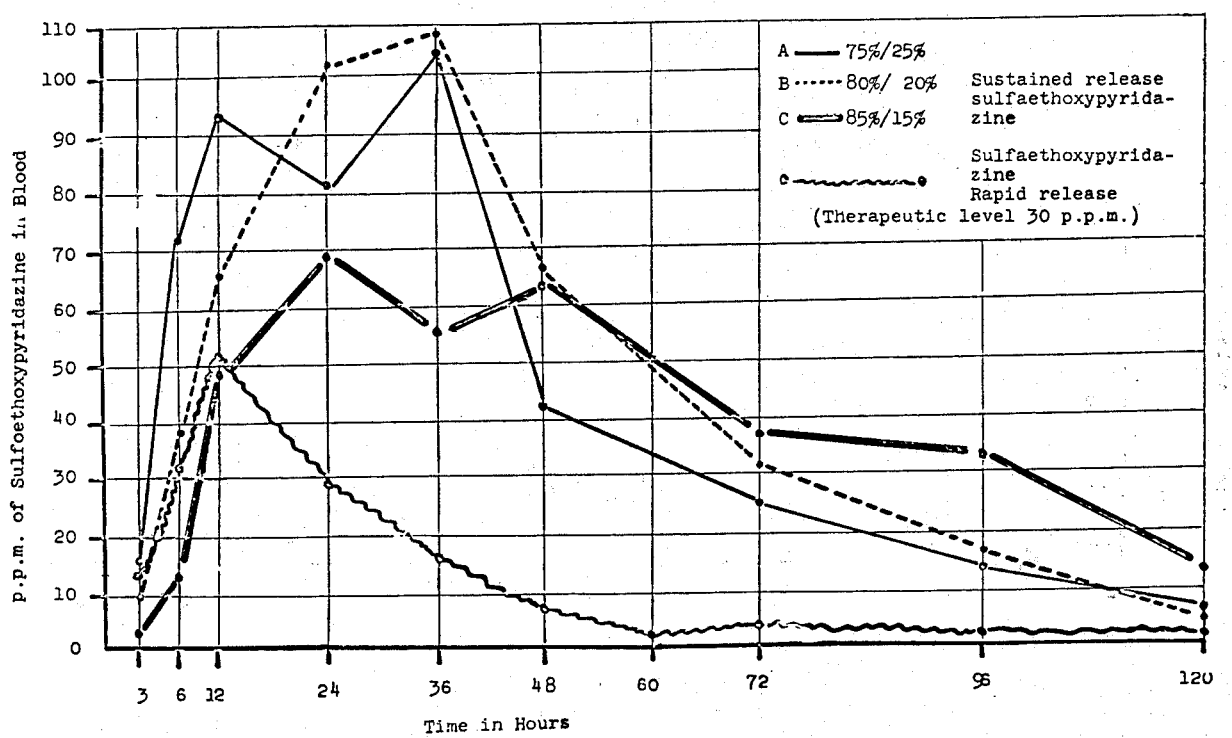

EXAMPLE 8

To compare the novel sustained release formulations of the present invention with the commercially available sustained release sulfamethazine formulation, used at 120 mg. per pound of body weight, calves are randomly divided into groups of 3 or 6 calves. Groups A through D are given the commercial sulfamethazine tablets as a single oral dose at the recommended level of 120 mg./pound of body weight. As in Examples 4-7 above, the calves are permitted free access to feed and water during the test and blood samples are taken periodically and analyzed for sulfamethazine.

Group E received a single oral dose, 100 mg./pound of body weight of a 75 percent sustained release/25 percent rapid release formulation with 2 percent ethylcellulose in the sutained release fraction. Group F received a similar formulation with 3 percent ethylcellulose in the sustained release fraction. The formulation, with ethylcellulose adjusted, is as follows:

| | Gm/Tablet |
|---|---|
| Sulfaethoxypyridazine | 15.00 |
| Starch USP | 0.35 |
| Starch modified | 0.30 |
| Bismuth subcarbonate | 7.15 |
| Ethylcellulose NF (10 cps) | (0.35 or 0.55) |
| Magnesium Stearate | 0.15 |
| Stearic Acid | 0.15 |

Blood levels obtained with the 2 percent ethylcellulose and the 3 percent ethylcellulose are reported as E and F the following Table 6.

TABLE 6

| Time Post administration, hrs. | Apparent Sulfamethazine in Blood, PPM | | | | Apparent S.E.Z. in Blood, PPM | |
|---|---|---|---|---|---|---|
| | A | B | C | D | E | F |
| 3 | 1.8 | 3.3 | 3.6 | 2.1 | 43.9 | 38.1 |
| 6 | 7.8 | 7.4 | 7.3 | 4.3 | 51.8 | 60.4 |
| 12 | 16.2 | 19.6 | 10.2 | 12.4 | 71.9 | 89.2 |
| 24 | 14.2 | 21.4 | 18.7 | 20.9 | 83.4 | 81.9 |
| 36 | 49.2 | 33.0 | 21.8 | 22.4 | 58.9 | 62.1 |
| 48 | 19.6 | 30.8 | 22.2 | 22.4 | 24.2 | 44.9 |
| 60 | 7.0 | 25.4 | | | | - |
| 72 | 40.7 | 34.8 | 20.1 | 19.9 | 11.0 | 19.0 |
| 96 | 21.4 | 15.5 | 12.6 | 18.7 | 3.1 | 6.5 |
| 120 | 13.4 | 12.0 | 5.2 | 16.3 | 1.7 | 3.7 |

In the following Graph IV, the average of data obtained in A-D above for sulfamethazine at 120 mg./lb. is compared with the sulfaethoxypyridazine (sustained release/rapid release) 75/25, 2 percent and 3 percent ethylcellulose formulations.

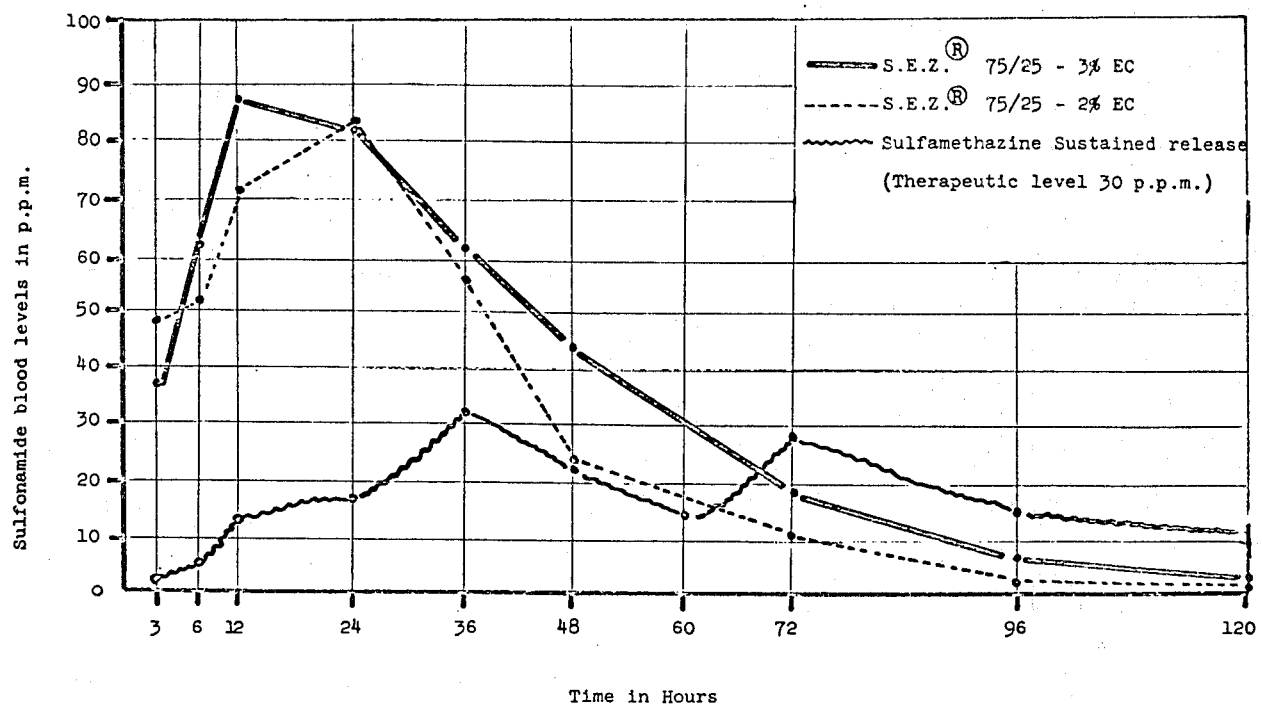
EXAMPLE 9
A comparison of the data obtained with the rapid release S.E.Z. formulation of Example 4, the sulfamethazine sustained release product (Groups A–D) of Example 8 and an average of the preferred 75/25 — 3 percent ethylcellulose formulations of Examples 6 and 7 are made in Graph V.
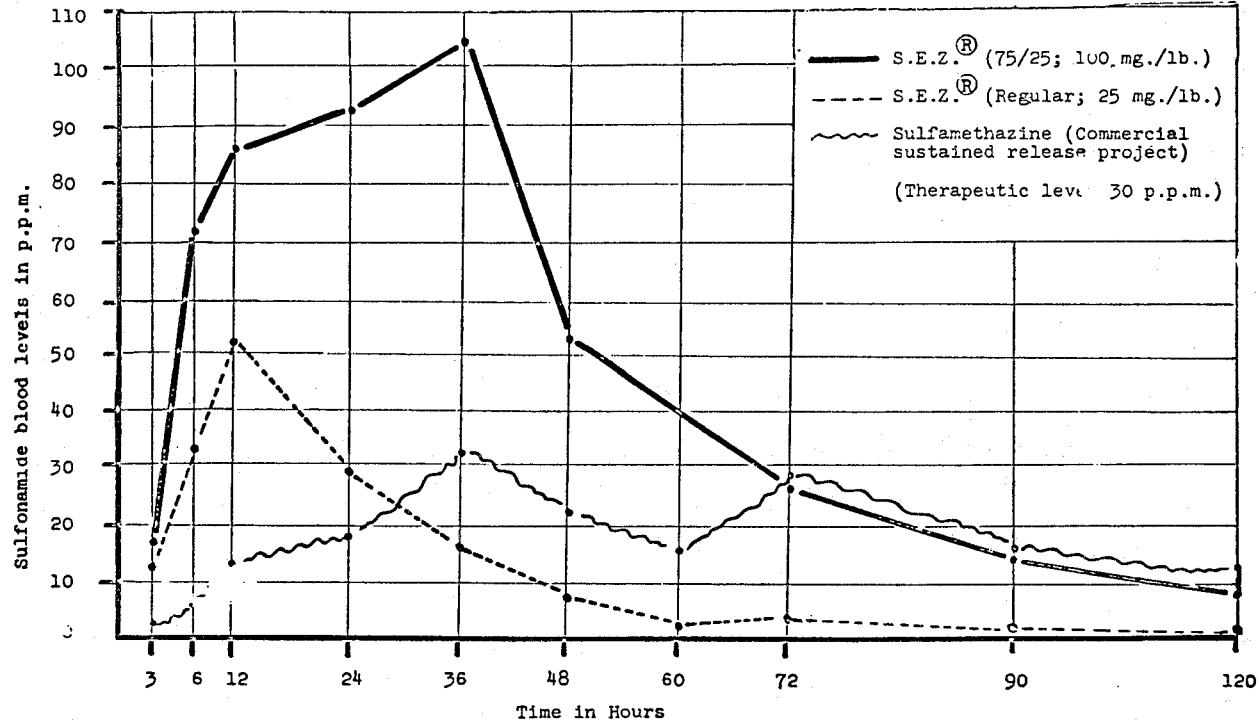

The graph shows that sulfaethoxypyridazine (75/25) reached much higher levels and maintained therapeutic levels or above for at least 60 hours.

We claim:

1. A therapeutic composition of matter having sustained antibacterial activity in ruminant animals consisting essentially of a tablet comprising from 60 to 72 percent Sulfamethoxypyridazine or Sulfaethoxypyridazine, 35 to 23 percent heavy density bismuth subcarbonate or bismuth sub-nitrate effective to provide a dosage unit which will remain in the rumen during the period of release and which will not be excreted before the sulfadrug has been absorbed into the blood stream and 2 to 5 percent ethylcellulose said tablet being formed by mixing separately granulated (1) about 25 percent of a fast release formulation consisting essentially of an immediate initially high effective fast build-up blood level dosage of said sulfadrugs and starch together with (2) about 75 percent of a sustained release formula-tion consisting essentially of an effective slow build-up blood level dosage of said sulfadrugs, about 35 percent said bismuth salts and about 5 percent ethylcellulose.

2. A therapeutic composition of matter in accordance with claim 1, essentially containing sulfaethoxypyridazine 66 percent heavy density bismuth subcarbonate 30 percent, and ethylcellulose 3 percent.

3. A theraputic composition of matter in accordance with claim 1, essentially containing sulfaethoxypyridazine 67.5 percent, heavy density bismuth subcarbonate 28.5 percent, and ethylcellulose 3 percent.

4. A therapeutic composition of matter in accordance with claim 1, essentially consisting of from 60 to 72 percent sulfaethoxypyridazine, 35 to 23 percent heavy density bismuth subcarbonate and 2 to 5 percent ethylcellulose.

5. A method of controlling bacterial infections in ruminant animals for an extended period of time comprising the administration to said animals of from about 25 mg. per pound of body weight to about 200 mg. per pound of body weight of the therapeutic composition of matter of claim 1.

* * * * *